United States Patent [19]

Leszak

[11] 4,004,441
[45] Jan. 25, 1977

[54] PROCESS FOR MODIFYING CAPILLARY GROOVES

[75] Inventor: Edward H. Leszak, Amityville, N.Y.

[73] Assignee: Grumman Aerospace Corporation, Bethpage, N.Y.

[22] Filed: Aug. 28, 1975

[21] Appl. No.: 608,705

[52] U.S. Cl. .................................... 72/75; 72/123; 165/133

[51] Int. Cl.² ........................................ B21D 53/06

[58] Field of Search .................. 72/75, 77, 78, 112, 72/113, 122, 123; 165/133; 27/157.3 A, 157.3 B

[56] References Cited

UNITED STATES PATENTS

| 246,346 | 8/1881 | Scheermesser | 72/75 |
|---|---|---|---|
| 1,273,475 | 7/1918 | Foster | 72/75 |
| 2,779,222 | 1/1957 | Edwards | 72/113 |
| 3,468,020 | 9/1969 | Carlson et al. | 29/597 |
| 3,768,290 | 10/1973 | Zatell | 165/133 |

*Primary Examiner*—Lowell A. Larson
*Attorney, Agent, or Firm*—Morgan, Finnegan, Pine, Foley & Lee

[57] ABSTRACT

The process of passing a rotating tool through a tubular workpiece such as a heat pipe having longitudinal capillary grooves in the walls thereof such that a swaging ball carried by the tool flattens the lands between the grooves to thereby produce a capillary configuration in which the width of the opening of the grooves is narrower than a cross-section of the groove and the lands between the grooves have a mushroom-shaped cross-section. Deformation of the lands by the swaging ball is essentially of a limited-load point-contact type to avoid a destructive collapse of the lands during the swaging process.

15 Claims, 5 Drawing Figures

PROCESS FOR MODIFYING CAPILLARY GROOVES

This invention relates to a process for making capillary grooves having openings that are smaller in width than the cross-sections of the grooves, and in particular, to a process employing swaging apparatus utilizing deforming means having a lightly loaded, limited-area contact for producing such capillary grooves.

BACKGROUND OF THE INVENTION

Although not limited thereto, this process has particular value for working the longitudinal grooves used as capillaries in the casings of heat pipes. The term heat pipe refers to a well-known class of heat transfer devices that comprise a closed casing, a liquid transport means and a vaporizable liquid. The heat pipe operates by having a heat input region wherein the vaporizable liquid boils and changes to the vapor state and a heat rejection region where the vapor is condensed to a liquid. The liquid is returned to the heat input region by the liquid transport means which may comprise a grooved longitudinal or annular capillary wall, a screen mesh artery or a combination of both of those devices.

The present invention provides a process that can be used in the manufacture of a heat pipe having an improved longitudinal grooved capillary wall wherein the grooves have an opening that is smaller than the width of the groove and the lands between the grooves have mushroom-shaped cross-sections. This structure provides a heat pipe that will hold liquid in all of its longitudinal grooves, both top and bottom. This heat pipe will have good "tilt" capability due to the capillary action in the grooves which have a narrow opening. Grooves of this configuration will also insure that the heat pipe will have good flow and filling characteristics due to the venting and capillary action of the narrow opening of the grooves. If the grooves are not completely full, the vaporizable liquid in the narrow-opening grooves will tend to flow up the side walls by film action, and feed into the opening of the grooves.

In the condensing region of the heat pipe, the narrow groove openings act as wicks, attracting and sucking the condensing vapor into the grooves. The lands between the grooves of a heat pipe made according to this invention also contribute to an increased thermal efficiency as the mushroom shape of the lands results in a greater surface area being exposed to the vaporizable liquid, especially in the areas where nucleate boiling and/or film vaporization normally take place.

DETAILED DESCRIPTION OF THE INVENTION

The process of this invention utilized metal-deforming means such as a swaging ball or a similar suitable tool having a limited-area surface to work the workpiece which is mounted in an appropriate machine such that the deforming means can be passed through the bore of the workpiece. The workpiece may be a heat pipe or other tubular structure having capillary grooves in the wall thereof and the process is used to modify the lands between the grooves such that a narrow-opening capillary configuration is obtained. Means are furnished for providing for relative rotation between the deforming tool and the tubular workpiece. Means are also incorporated in the deforming means to provide for the adjustment of the swaging means thereof to thereby vary the degree of metal deforming engagement with the workpiece.

This process comprises the steps of first, rotationally passing a tool having one or more ball swagers or similar means through tubing having a plurality of grooves that are separated by lands, said rotating tool being positioned so that the swaging means contacts the lands with sufficient pressure to deform the face thereof. Subsequently, if desired, there may be a second operation comprising the step of passing said tool through said tubing in counter-rotation to the direction of rotation of the first pass with said rotating tool positioned so that the swaging means again contacts the previously deformed lands so that they are formed into a configuration having a mushroom-shaped cross-section.

This invention is particularly suitable for use in the manufacture of tubular heat exchange devices such as heat pipes, preferably one having a closed casing, a longitudinal wall capillary, and a working fluid such as a vaporizable liquid therein. In this process, the lands of the grooves of the capillary are deformed so that the width of the opening of the groove is smaller than the width of the cross-section of the groove and the lands between the grooves after deformation have a substantially mushroom-shaped cross-section. This process has been utilized to make efficient heat pipes in which the width of the opening of the groove that is in communication with the interior of the heat pipe is dimensioned so that when the vaporizable liquid is in the liquid state, it will be held in the longitudinal grooves by surface tension. The various dimensions of the grooves will vary with the requirements; however, the means of the invention may be used with heat pipe capillaries having grooves having cross-sections that are about 0.015–0.035 in depth and about 0.015–0.035 inch in width. The opening of the grooves after processing will be from about 0.001 to 0.010 inch in width. Generally, the width and the height of the mushroom-shaped land will approximate the dimensions of the adjacent grooves of the base portion of the mushroom-shaped land. Capillary grooves having the described characteristics are described as having a "re-entrant" configuration.

DESCRIPTION OF THE PREFERRED EMBODIMENT

Figure 1:
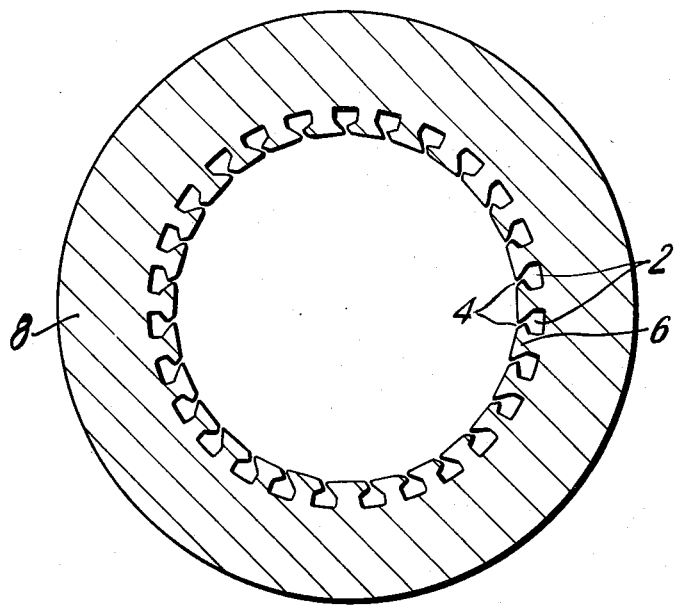
FIG. 1 is an enlarged cross-sectional view of a heat pipe which shows the grooves and mushroom-shaped lands of the capillaries manufactured by the process of the invention.
Figure 2:
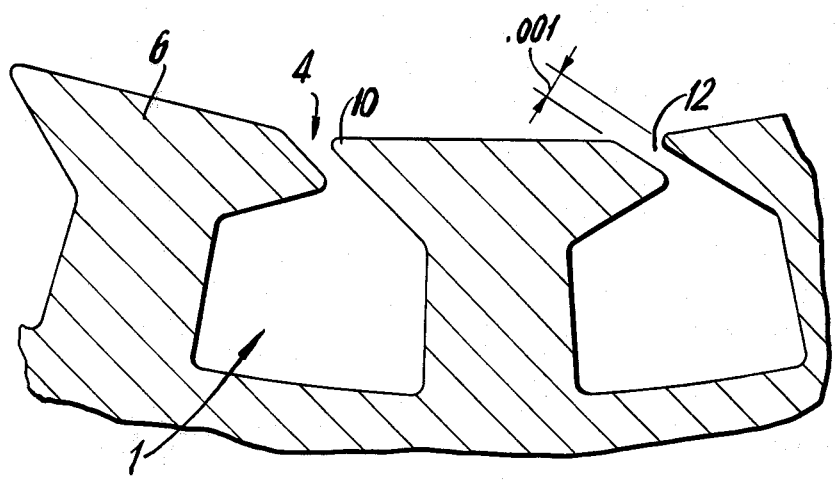
FIG. 2 is a greatly enlarged portion of a cross-sectional view of the capillaries made by the process of the invention.

FIG. 1 of the drawings is a cross-section of the capillary grooves of a heat pipe showing the grooves 2 and the narrow opening 4 modified in accordance with the process of the invention. The mushroom-shaped lands 6 separate the longitudinal grooves and form the narrow openings 4. The wall 8 of the heat pipe is shown in cross-section at the mid-point of the heat pipe. This section generally will be identical with sections taken at the evaporation region and at the condensation region of the heat pipe. FIG. 2 is a partial section of capillary grooves produced by means of the invention. This view clearly shows the mushroom-shaped lands 6 and the narrow groove opening 4. The mushroom-shaped lands have a left upper peripheral edge 10 and a right upper peripheral edge 12. The drawing shows that the upper right and left peripheral edges have a slightly different configuration which is caused by the process which they are made. This process has been described supra.

Figure 3:
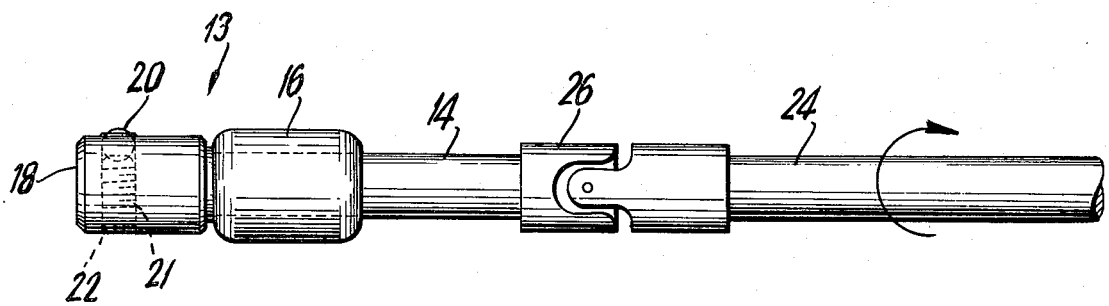
FIG. 3 is an elevation of an embodiment of metal-deforming means useful in the process of the invention.

Reference is now made to FIG. 3 illustrating a preferred embodiment of a tool utilized in the process of the invention. The tool 13 comprises a shaft 14, a guide bushing 16 having an outside diameter sized to have a clearance fit within the workpiece (not shown) before forming and the swaging means holder 18. Holder 18 mounts the swaging means such as swager ball 20. Only a single swager ball is shown, however, it will be understood that holder 18 can be provided with multiple swager balls positioned circumferentially or longitudinally with respect to one another. The ball 20 is retained in a transverse threaded hole 21 provided in the holder 18 and a set screw 22 is provided to adjust the ball so as to vary the protrusion thereof with respect to the surface of the holder. The shaft 14 of the tool is connected to a draw rod 24 by means of a rigid connection or, as shown, by flexible means such as a universal 26. Draw rod 24 is attached to the carriage of a suitable rotation producing machine, preferably a lathe, that is geared to have a predetermined axial travel in addition to its rotation. It will be appreciated that the tool 13 can be pushed through the workpiece rather than drawn therethrough and the required relative rotation between workpiece and the machine can be produced either by rotating the workpiece or the machine carriage.

Figure 4:
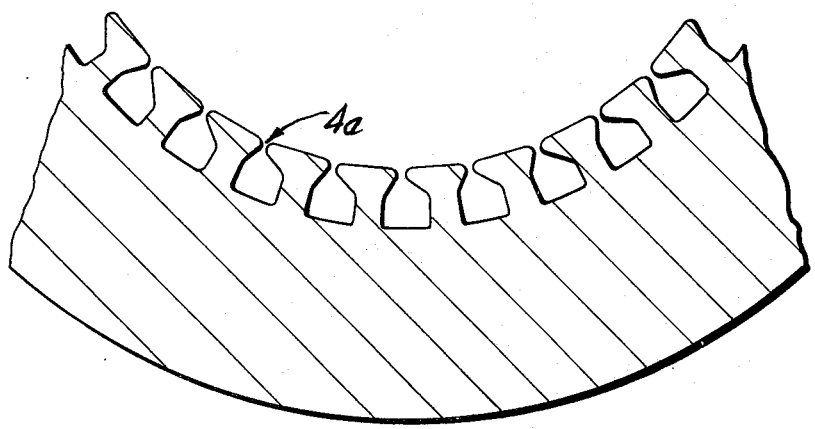
FIG. 4 is an enlarged cross-sectional view of a heat pipe embodying an alternate configuration of capillary grooves made in accordance with the invention.

In the process of this invention, the workpiece to be worked has been provided previously with conventionally machined or extruded straight-sided longitudinal capillary grooves. The workpiece is mounted in the machine with the tool 13 positioned at one end of the workpiece. After relative rotation is established, the tool 13 is passed through the workpiece with the axial tool travel and feed (extent of swaging action by the swager 20) being controlled so as to produce a limited-area deformation (small "footprint") of the lands of the capillary grooves of the workpiece. An excessive amount of deformation of the lands during swaging is to be avoided because the column strength of the lands of capillary sizes cannot withstand the loads thereby imposed. It is believed that the failures or unsatisfactory configurations that result from attempts to "squash-down" or otherwise swage the capillary lands by conventional techniques in which a ball or plug is forced through the workpiece, is due to the inability of the lands to take forming loads having excessive magnitudes. It is believed, therefore, that the success achieved by the process of this invention results from the application of relatively light swaging loads and the incremental deformation of only a small area of each land at a time such that they are progressively deformed to achieve the desired groove configuration. A single pass of the tool through the workpiece will result in a generally "one-sided" deformation of the land as illustrated in FIG. 4 because the swager ball 20 has caused a displacement of metal largely in its direction of rotational travel. However, such one-sided groove configuration is acceptable for use if conditions such as the proper width of the groove opening 4a and the like are achieved.

To obtain a more uniform capillary groove configuration, the tool is passed through the workpiece again with relative rotation between tool and workpiece being in a direction opposite to that of the first pass. In the first pass, the protrusion of the ball 20 with respect to the holder 18 should be some dimension intermediate the protrusion of the ball during the second pass of the tool through the workpiece. Prior to the second pass, set screw 22 should be adjusted to obtain a protrusion of the ball which will produce a deformation of the top of the lands 6 during the passage of the tool that will mushroom the lands to a degree that will result in groove openings 4 of the required width.

Figure 5:
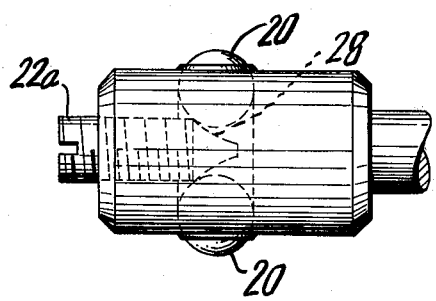
FIG. 5 is an elevation of an embodiment of a swaging means holder that may be adjusted without withdrawing the metal deforming means from the workpiece.

FIG. 5 of the drawings is another embodiment of a swaging means holder that permits adjustment of the swager balls 20 without withdrawing the tool from the workpiece. This is made possible by the use of two or more circumferentially arranged swager balls and swager ball adjustment means in the form of a coaxially located set screw 22a that engages the swager balls with a conically shaped end 28. In a preferred arrangement, two opposed swager balls will be employed 180° apart. As the set screw is tightened, the conical end causes the swager balls to move in a radial direction and exert pressure on the lands of the capillary grooves of the workpiece.

The swager balls 20 may be held within the swaging means holder 20 by peening over the edge of the hole in the swaging means holder.

The terms "first" pass and "second" pass are not intended to limit the process to two successive passes having directions of rotation in opposite directions as it will be understood that more than two passes can be employed if such is required to work the workpiece properly.

In this exposition of the invention, emphasis has been placed on the working of capillary grooves in the inside surface of the wall of a tubular workpiece; however, if obvious modification is made to the apparatus, the principles of this invention are equally applicable to grooves on the outer wall surface of the workpiece and such is considered within the scope of the invention.

Although the above examples have shown various modifications of the present invention, other variations are possible in light of the above teachings. It is, therefore, to be understood that changes may be made in the particular embodiments of the invention described which are within the full intended scope of the invention as defined by the appended claims.

I claim:

1. A process for manufacturing tubing having longitudinal capillary grooves formed in the wall thereof in which the lands between said grooves are such that the width of the opening of the grooves is smaller than the width of the cross-section of the groove, said process comprising the steps of:

establishing relative axial rotation between the workpiece and a tool having metal deforming means; and passing said tool along the axial length of the workpiece, said tool being positioned so that said deforming means contacts said lands between said grooves with sufficient pressure to cause a displacement of portions of the tops of said lands such that said displaced portions serve to reduce the opening of said grooves.

2. The process of claim 1 wherein the longitudinal grooves are in the inside wall of the workpiece and the tool is passed along the bore of said workpiece.

3. The process of claim 1 wherein the metal-deforming means is a swager ball.

4. The process of claim 1 wherein the tool is the rotating element.

5. The process of claim 1 wherein the width of the opening of the grooves is controlled by adjusting the metal-deforming means to regulate the amount of displacement that the top portions of the lands undergo.

6. The process of claim 1 wherein the tool is passed along the axial length of the workpiece more than once and wherein the direction of relative rotation between said tool and said workpiece during each subsequent pass is reversed in direction with respect to that of the previous pass.

7. The process of claim 6 wherein the metal-deforming means are adjusted prior to each pass to increase incrementally the displacement of portions of the top of the lands.

8. The process of claim 7 wherein the metal-deforming means are adjusted incrementally until the width of the opening of the grooves is smaller than the cross-sections of the grooves and the lands between said grooves have a mushroom-shaped cross-section.

9. The process of claim 2 wherein the tubing is adapted to comprise the wall of the closed casing of a heat pipe having a vaporizable liquid therein and wherein the openings of the grooves are in communication with the interior of said heat pipe and are dimensioned such that said vaporizable liquid when in the liquid state will be held in said grooves by surface tension.

10. The process of claim 9 wherein the width of the opening of the grooves is between 0.001 inch and 0.010 inch.

11. The process of claim 2 wherein the tool having metal-deforming means comprises a swaging means holder that is connected to drive means, said swaging means holder having at least one metal-deforming means; and a freely rotating guide bushing.

12. The process of claim 11 wherein each of the metal-deforming means is a swager ball.

13. The process of claim 12 wherein the swaging means holder includes swager ball adjustment means and at least two circumferentially arranged swager balls.

14. The process of claim 11 wherein the holder member is connected to drive means through a universal coupling.

15. A process for manufacturing a heat pipe casing wherein the wall capillary consists of longitudinal capillary grooves formed in the wall thereof in which the lands between said grooves are such that the width of the opening of the groove is smaller than the width of a cross-section of the groove, said process comprising the steps of:
establishing relative axial rotation between the workpiece and a tool having metal deforming means; and
passing said tool along the axial length of the workpiece, said tool being positioned so that said deforming means contacts said lands between said grooves with sufficient pressure to cause a displacement of portions of the tops of said lands such that said displaced portions serve to reduce the opening of said grooves.

* * * * *